(12) United States Patent
Janssen et al.

(10) Patent No.: US 6,197,845 B1
(45) Date of Patent: *Mar. 6, 2001

(54) HOT MELT ADHESIVE COMPOSITIONS FOR ADHERENCE TO SKIN AND ARTICLES CONSTRUCTED THEREFROM

(75) Inventors: Annegret Janssen, Lueneburg; Gerhard Endriss, Neubiberg, both of (DE)

(73) Assignee: H.B. Fuller Licensing & Financing, Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,430

(22) Filed: Jun. 15, 1998

(51) Int. Cl.$^7$ .............................. A61F 13/00; A61F 13/15; C08L 53/02; B05D 1/02; B05D 1/32
(52) U.S. Cl. ...................... 523/111; 156/291; 156/327; 427/2.31; 427/208.2; 427/286; 427/288; 427/420; 427/422; 524/505; 525/314; 525/98; 604/389; 428/355 BL
(58) Field of Search .............................. 524/505; 525/98, 525/319; 428/355 BL; 427/2.31, 208.2, 286, 288, 420, 422; 604/389; 156/291, 327; 523/111

(56) References Cited

U.S. PATENT DOCUMENTS

| | | | | |
|---|---|---|---|---|
| 4,032,492 | * | 7/1977 | Englund et al. | 524/505 |
| 4,087,824 | * | 5/1978 | Bronstert et al. | 524/505 |
| 4,136,699 | | 1/1979 | Collins et al. | 524/505 |
| 4,286,077 | * | 8/1981 | St. Claire et al. | 525/232 |
| 4,314,926 | * | 2/1982 | Allison, III | 524/505 |
| 4,460,364 | * | 7/1984 | Chen et al. | 524/505 |
| 4,785,996 | * | 11/1988 | Ziecker et al. | 239/298 |
| 4,833,193 | * | 5/1989 | Sieverding | 524/505 |
| 4,857,594 | * | 8/1989 | Lakshmanan et al. | 524/505 |
| 5,001,179 | * | 3/1991 | Kauffman et al. | 525/98 |
| 5,057,571 | * | 10/1991 | Malcolm et al. | 524/505 |
| 5,143,776 | * | 9/1992 | Givens | 428/194 |
| 5,204,390 | | 4/1993 | Szymanski et al. | 604/389 |
| 5,217,798 | * | 6/1993 | Brady et al. | 156/327 |
| 5,418,052 | * | 5/1995 | Sugie et al. | 524/505 |
| 5,459,193 | * | 10/1995 | Anderson et al. | 524/505 |
| 5,507,901 | * | 4/1996 | Limina et al. | 156/200 |
| 5,559,165 | * | 9/1996 | Paul | 525/98 |
| 5,569,348 | * | 10/1996 | Hefele | 156/239 |
| 5,618,883 | * | 4/1997 | Plamthottam et al. | 524/505 |
| 5,703,162 | * | 12/1997 | Anderson | 525/98 |
| 5,719,226 | * | 2/1998 | Kesley | 524/505 |
| 5,738,689 | * | 4/1998 | Suzuki et al. | 604/389 |
| 5,741,840 | * | 4/1998 | Lindquist et al. | 524/505 |
| 5,863,977 | * | 1/1999 | Fisher et al. | 524/505 |

FOREIGN PATENT DOCUMENTS

| | | | |
|---|---|---|---|
| 0 616 018 | * | 9/1994 | (EP) . |
| WO 94/02123 | | 2/1994 | (WO) . |

* cited by examiner

*Primary Examiner*—Peter A. Szekely
(74) *Attorney, Agent, or Firm*—Nancy N. Quan

(57) ABSTRACT

The present invention relates to a hot melt adhesive composition useful for articles such as plasters, bandages and tapes which are adhesively adhered to skin. The adhesive may be coated continuously and preferably, discontinuously onto a substrate. More preferably, the hot melt adhesive composition is pattern-coated. The adhesive is permanently adhered to at least one substrate of the article and removably or releasably attachable to skin. The adhesive advantageously does not cause skin irritation nor transfers adhesive to the skin upon removal.

23 Claims, 2 Drawing Sheets

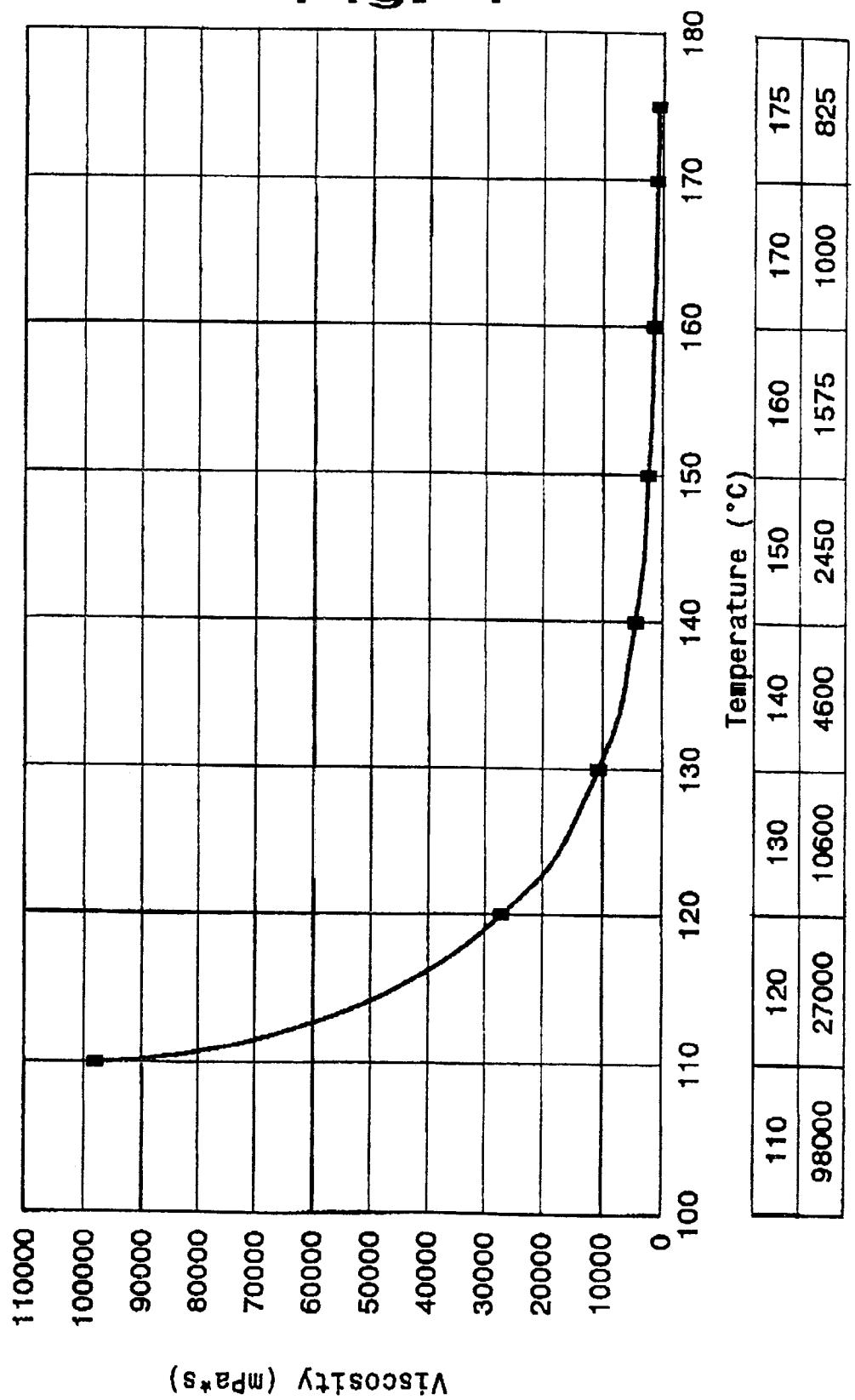

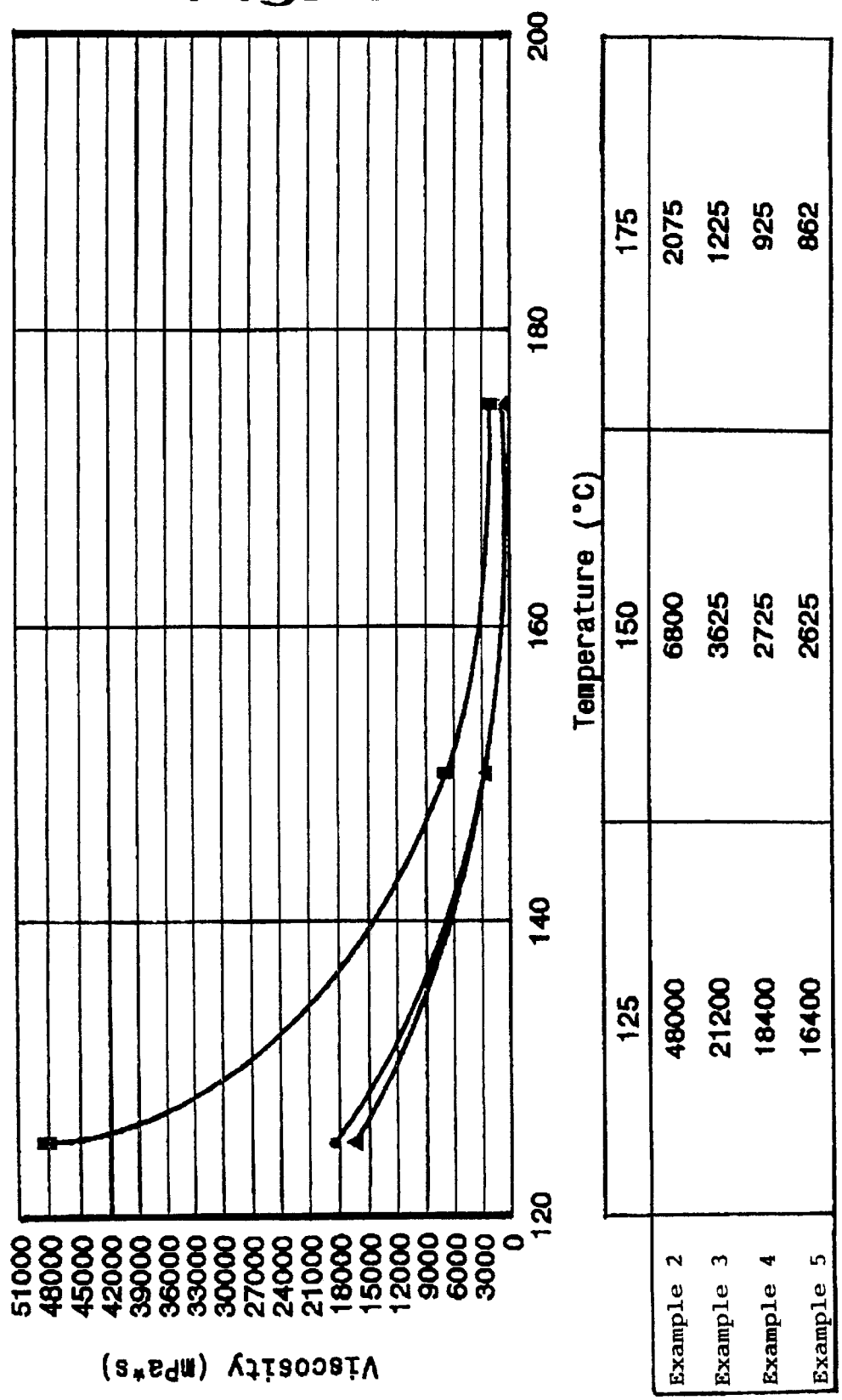

HOT MELT ADHESIVE COMPOSITIONS FOR ADHERENCE TO SKIN AND ARTICLES CONSTRUCTED THEREFROM

RELATED APPLICATION

This application claims priority to EP 97109865.2, filed Jun. 17, 1997.

FIELD OF THE INVENTION

The present invention relates to a hot melt adhesive composition useful for articles such as plasters, bandages and tapes which are adhesively adhered to skin. The adhesive may be coated continuously and preferably, discontinuously onto a substrate. More preferably, the hot melt adhesive composition is pattern-coated. The adhesive is permanently adhered to at least one substrate of the article and removably or releasably attachable to skin. The adhesive advantageously does not cause skin irritation nor transfers adhesive to the skin upon removal.

BACKGROUND OF THE INVENTION

Hot melt adhesives have been used to bond a variety of materials to many substrates. James P. Szymanski et al., U.S. Pat. No. 5,204,390, discloses pressure-sensitive hot melt adhesives comprising substantially saturated block copolymers, tackifying resin, and polybutene. This hot melt composition exhibits adhesive stability when exposed to ultra-violet light and is stable when contacted with plasticized surfaces.

Removable or releasable hot melt pressure-sensitive adhesives (PSA's) for articles such as feminine napkins, adult incontinent pads and the like are described as "garment attachment" or "positioning" adhesives. During manufacture of such articles, the hot melt PSA is typically slot-coated directly or transfer coated onto a polyolefin film substrate and then covered with a release liner. There are a multitude of patents pertaining to adhesive compositions for tapes, labels, adhesive bandages and the like. Collins et al., U.S. Pat. No. 4,136,699 specifically relates to hot melt PSA positioning adhesive compositions comprising substantially saturated block copolymers for feminine napkins.

In recent years, manufacturers have attempted to replace the continuous slot-coat method with various discontinuous methods, particularly by spray application methods, such as spiral spray and melt blown techniques or by pattern coating methods, otherwise referred to as screen-printing. There are several advantages in using a pattern coating technique, including aesthetic advantages due to the variety of screen designs as well as the ability to strategically place adhesive in precise locations. The primary advantage pattern coating offered is the ability to vastly reduce adhesive consumption, since the surface area per mass of adhesive is greatly increased.

However, hot melt PSAs employed for slot-coat applications tend to exhibit hot melt adhesive transfer to the surface it is removed from when coated discontinuously onto a substrate. Further, the hot melt adhesives known from the prior art have the drawback that they cause skin irritation when in contact with skin for a period of time. To counteract such skin irriation, the adhesive compositions of the prior art necessitate the addition of zinc oxide. Moreover, articles constructed from these hot melt adhesives often do not adhere properly to skin and thus can easily shift and become unattached. Finally, the hot melt adhesive compositions known from the prior art can separate from the substrate permanently adhered to due to mechanical influence.

Hence, industry would find advantage in a hot melt adhesive composition wherein the adhesive is permanently adhered to a substrate and is removably attachable to skin in order to secure an article for a period of time and can be subsequently removed without causing skin irritation or adhesive transfer.

SUMMARY OF THE INVENTION

The present invention is a hot melt adhesive composition comprising a block copolymer, a tackifying resin, an extending agent and optionally additives, wherein all the ingredients employed are substantially saturated. Preferably, the block copolymer has styrenic end block(s) and a midblock comprising ethylene/butylene, ethylene propylene, and mixtures thereof. Most preferred block copolymers have a solution viscosity of at least 50 cPs or greater, more preferably about 100 cPs, and most preferably about 200 cPs up to about 2000 for a 25 wt-% solution of the polymer in toluene at 25° C. and a diblock content of greater than about 35 wt-%, more preferably greater than about 50 wt-%, and most preferably ranging from about 70 wt-% to about 100 wt-% diblock.

The adhesive exhibits a combination of properties which are amenable to hot melt PSA pattern coating. The adhesive composition exhibits a ring and ball softening point of up to 125° C., a viscosity at 175° C. of from about 500 to about 20,000 mPa.s, a tensile strength of 0.10 to 0.80 N/mm$^2$, an elongation at break from 500% to 1500%, and a needle pentration of 3 to 12 mm.

DESCRIPTION OF THE DRAWINGS

The viscosity of the hot melt composition of Examples 1 to 5 are graphically illustrated in FIGS. 1 to 2.

FIG. 1 is a graph of viscosity as a function of temperature of Example 1, whereas FIG. 2 is a graph of viscosity as a function of temperature for Examples 2 to 5.

DETAILED DESCRIPTION OF THE INVENTION

The hot melt adhesive composition according to the present invention comprises:

a) from 5 to 50 wt-%, preferably 15 to 40 wt-%, more preferably 15 to 35 wt-% and most preferably 20 to 30 wt-% of a substantially saturated block copolymer;

b) 30 to 80 wt-%, preferably 35 to 65 wt-%, more preferably 40 to 60 wt-%, and most preferably 40 to 45 wt-% of at least one substantially saturated tackifying resin;

c) 5 to 55 wt-%, preferably 13 to 35 wt-% and more preferably 20 to 30 wt-% of at least one substantially saturated plasticizer; and d) 0 to 50 wt-%, preferably 0.1 to 10 wt-% and more preferably 0.1 to 5.0 wt-% of additive(s).

Hence, all the ingredients employed are substantially saturated. The term "saturated" as used herein means that the ingredient is substantially free of double bonds which are easily susceptible to oxidation. Accordingly, substantially saturated also refers to substantially fully hydrogenated. The Applicants surmise that the avoidance of unsaturated components contributes to the lack of skin irritation. Further, this use of substantially saturated ingredients also results in excellent melt stability and ultra-violet light stability.

The hot melt adhesive of the present invention comprises at least one substantially saturated block copolymer present in an amount ranging from 5 to about 50 wt-%, preferably from about 15 to about 40 wt-%, more preferably from about 15 to about 35 wt-% and most preferably from about 20 to about 30 wt-%. At concentrations below 5 wt-% the adhesive lacks sufficient tensile strength and tends to exhibit adhesive transfer upon removal from the surface it is intended to be removably adhered to. Alternatively, at higher polymer concentrations, the adhesive is not sufficiently deformable to adhere adequately and exhibits too high of a viscosity to be pattern coated at low application temperatures.

The preferred block copolymers have non-elastomeric end blocks comprising styrene and rubbery midblocks comprising ethylene/propylene, ethylene/butylene, and mixtures thereof. Such polymers are commercialy available from Shell Chemical Company under the tradename Kraton® G series as well as from Kurraray.

In order to achieve the preferred viscosity and ring and ball softening point, preferably the block copolymer has a melt index (Condition G) of greater than about 10 g/10 min, more preferably greater than about 20 g/10 min, even more preferably greater than about 30 g/10 min., and most preferably ranging from about 50 g/10 min. to 200 g/10 min. Additionally, in order to achieve the required softness or deformability, higher diblock containing polymer are preferred alone or in combination with a predominantly triblock, 100% coupled, block copolymer structure. Diblock refers to the molecules having an A-B structure wherein A is a nonelastomer such as polystyrene and B is the rubbery block. Diblock differs from triblock in that it does not have a nonelastomeric styrene or vinyl blocks on both ends. Preferably, the diblock content of the block copolymer(s) is greater than about 35 wt-% with respect to the total weight of the block copolymers, more preferably about 50 wt-% and greater, and more preferably about 70 wt-% to about 100 wt-% diblock. Further, preferred block-copolymers have an endblock to midblock ratio of $^{10}/_{90}$ (10% styrene end block) to 40/60 wt-% and more preferably ranging from about 25 wt-% to about 40 wt-% endblock (styrene).

Commercially available block copolymers useful for the invention include (KRATON) G 1650, a 29% styrene, 8000 solution viscosity (25 wt-% polymer), 100% triblock styrene-ethylene/butylene-styrene (S-EB-S) block copolymer; (KRATON) G 1652, a 29% styrene, 1350 solution viscosity (25 wt-% polymer), 100% triblock S-EB-S block copolymer; (KRATON) G 1657, a 4200 solution viscosity (25 wt-% polymer), 35% diblock S-EB-S block copolymer; all available from the Shell Chemical Company. The preferred block copolymers are of the styrene-ethylene/propylene (S-EP) types and are commercially available under the tradenames (KRATON) G 1726, a 28% styrene, 200 solution viscosity (25 wt-% polymer), 70% diblock S-EB-S block copolymer; (KRATON) G-1701X a 37% styrene,>50,000 solution viscosity, 100% diblock S-EP block copolymer; and (KRATON) G-1702X, a 28% styrene, >50,000 solution viscosity, 100% diblock S-EP block copolymyer also available from the Shell Chemical Company.

The adhesive of the present invention comprises at least one substantially saturated tackifying resin present in an amount ranging from about 30 wt-% to about 80 wt-%, preferably from about 35 wt-% to about 65 wt-%, more preferably from about 40 wt-% to about 60 wt-%, and most preferably from about 40 wt-% to about 45 wt-%. However, higher tackifying resin concentrations may be employed if the tackifying resin is a liquid at ambient temperature (25° C.).

The tackifying resins useful to the present invention are also substantially saturated and included dicyclopentadiene based resins, substantially fully hydrogenated aliphatic C5 and C9 resins, and substantially saturated aromatic monomer based resins such as a-methylstyrene based resins. The preferred tackifying resins are water white in appearance, indicative of their lack of impurities. Commercially available saturated tackifying resins suitable for use in the present invention include Arkon P 90, Arkon P 125, Arkon P 140, fully saturated alicyclic hydrocarbon resins from the Arakawa Chemicals Industries Ltd.; (ESCOREZ) 5300, (ESCOREZ) 5320, (ESCOREZ) 5340 and (ESCOREZ) 5380, dicyclopentadiene resins from Exxon Chemical Company; Regalrez 1018, a liquid resin (Tg=–20° C.) based on hydrogenated polymerized styrenic based monomers; as well as (KRISTALEX) F85 and (KRISTALEX) F100, alpha-methyl styrene resins from Hercules GmbH. Tackifying resins which are not water white yet are nearly fully hydrogenated are also surmised to be useful such as the (ESCOREZ) 5400 series as well as Hercules (REGALITE) R-stype resins.

The hot melt adhesive of the present invention comprises a plasticizer or extending agent present in an amount ranging from about 5 wt-% to about 55 wt-%, preferably from about 15 wt-% to about 35 wt-% and most preferably from about 20 wt-% to about 30 wt-%. However, in embodiments wherein high concentrations of liquid tackifiers are employed, the adhesive composition may be comprised entirely of block copolymer and tackifying resin. A minimal amount of liquid ingredient beneficially softens the block copolymer and solid tackifying resin as well as increases the compliance, elongation and needle penetration properties in addition to reducing the viscosity of the adhesive composition. The plasticizer is also substantially saturated and is typically a liquid at ambient temperature. Suitable plasticizing diluents include predominantly parafinic oils having minor amounts of naphthenic and minor amounts of aromatic components as well as liquid polymers such as low softening point alphaolefins, particularly polyisobutylene and liquid copolymers such as LSVI-101. Preferably, the plasticizing diluent is an oil which comprises a parafinic content of 50 wt-% to 90 wt-%, a naphthenic content of 10 wt-% to 40 wt-% and an aromatic content of no more than about 10 wt-% such as white mineral oils. Such oils are commercially available under the trademarks (CATENEX), e.g., (CATENEX) P941 of the Shell Company or Shell Oil 4142 FU, as well as Kaydol Oil of the Witco Company.

Optionally, the hot melt adhesive compositions may further comprise an additive, such as an inorganic filling agent, pigments, anti-oxidant, ultraviolet or other light protecting agents, and the like. Since the adhesive hot melt formulation according to the present invention causes practically no skin irritation, it is not necessary to add zinc oxide to the adhesive formulation. However, the addition of a small amount of zinc oxide can be beneficial. Further, various medicinal components may be added for transdermal drug delivery applications. As is known in the art, various other components can be added to modify the tack, colour, odour, etc. of a hot melt adhesive. It is generally preferred that the other components or ingredients should be relatively inert and have negligible effects on the properties contributed by the block copolymer, tackifying agent, and extending agents.

Techniques for manufacturing articles comprising the hot melt adhesive of the present invention include continuous coating methods, such as slot-coating as well as various discontinuous methods, particularly spray application methods, such as spiral spray and melt-blown techniques, and by pattern coating methods, otherwise referred to as screen-printing. The hot melt adhesive composition of the present invention is particularly preferred for pattern coating which involves extruding the molten adhesive through a rotating screen which in turn deposits the adhesive directly onto the substrate to be coated. Alternatively, the hot melt adhesive composition may be first deposited onto release paper and then transfer coated onto the intended substrate. The screens typically used in this process range from about 15 mesh to about 195 mesh, preferably from about 30 to about 60 mesh, and more preferably from about 30 to about 40 mesh. A 30 to 60 mesh screen results in individual hot melt adhesive deposits ranging in mass from as little as about $5 \times 10^{-5}$ g per hot melt adhesive deposit to about 0.05 g per adhesive deposit. The number of individual hot melt adhesive deposits per area of substrate ranges from as little as 1 per $cm^2$ to as many as about 100 per $cm^2$. The total mass of adhesive per area ranges from as little as about 5 $g/m^2$ to about 500 $g/m^2$, preferably from about 15 $g/m^2$ to about 300 $g/m^2$, more preferably from about 60 $g/m^2$ to about 170 $g/m^2$, and most preferably from about $85 g/m^2$ to about 150 $g/m^2$ for some applications. For other applications total mass of adhesive per areas is as little as possible, ranging from about 5 $g/cm^2$ to about 50 $g/m^2$, since amounts greater than 50 $g/m^2$ exceed the coating weights currently used for most slot-coat applications. However, lower or higher amounts may be useful for some applications to alter the level of adhesion.

As previously mentioned, discontinuous coating methods, such as spray and pattern coating, are particularly preferred over slot coating, due to the possibility of greatly increasing the surface area per mass of adhesive and enhancing the level of adhesion. This increase in surface area provides sufficient adhesion, comparable to adhesion levels of slot-coat applications, at greatly reduced adhesive consumption levels. Moreover, pattern coating offers the advantage that small amounts of adhesive hot melt formulation can be strategically placed in precise locations. This aspect is particularly important for applying the hot melt adhesive composition onto nonwoven or woven stretchable bandages or breathable substrates, such as gauze, for better fit.

Preferably, the hot melt adhesive composition is pattern-coated directly onto the substrate for better anchorage of the individual adhesive deposits. The particular shape of the adhesive deposits may vary. Since screens are typically manufactured having square-shaped voids, the resulting adhesive deposit is typically a four-sided pyramid having a square base. However, triangular, circular, elliptical, etc. voids are also contemplated. Hemispherical adhesive deposits are anticipated to be preferred.

The Applicants have found that certain physical properties are predictive as to whether the adhesive has the proper balance of properties to be permanently adhered to the intended substrate of the article, yet removably adhere to a surface such as fabric or skin without adhesive transfer. Further, the Applicants have found that by employing substantially saturated ingredients the adhesive does not cause skin irritation.

The hot melt adhesive composition according to the present invention possesses a low viscosity in comparison to hot melt adhesive compositions commonly employed for slot-coating applications. The adhesive of the present invention exhibits a viscosity of less than 20000 mPa.s at 175° C., preferably 500 to 12000 mPa.s, more preferably 800 to 5000 mPa.s, most preferably 825 to 3000 mPa.s. At a viscosity of greater than about 20000 mPa.s the adhesive is not easily processed, particularly in the case of discontinuous application methods such as pattern-coating. At a viscosity of less than 500 mPa.s the adhesive transfers when removed.

The hot melt adhesive composition according to the present invention has a ring and ball softening point up to 125° C., preferably of 80° C. to 110° C., more preferably of 90° C. to 105° C. and most preferably of 95° C. to 103° C. The relatively low ring and ball softening point and low viscosity are of particular importance for direct coating of the hot melt adhesive composition onto heat sensitive substrate such as polyolefin films and nonwoven. Due to these combination of properties that adhesive may be applied at temperatures of less than about 160° C., preferably at temperatures of less than about 150° C., and most preferably at temperatures of less than about 140° C.

The hot melt adhesive composition according to the present invention has a needle penetration value at 25° C. of 3 to 12 mm, preferably 4 to 11 mm, more preferably 5 to 10 mm, and most preferably above 7 mm. Additionally, the adhesive composition has a tensile strength of up to 1 $N/mm^2$, preferably 0.10 to 0.80 $N/mm^2$, more preferably 0.30 to 0.70 $N/mm^2$ and an elongation at break from 500% to 1500%, preferably 600% to 1300%, more preferably 800% to 1200% and most preferably 830% to 1150%.

The viscosity, needle penetration, tensile strength and elongation relate to the compliance, ability to deform, or softness of the adhesive. When the the viscosity, needle penetration and tensile strength are too high, the adhesive layer of the article according to the present invention is less deformable to the substrate adhered to, such as skin or fabric, causing the adhesive layer to separate from the article resulting in adhesive transfer. Additionally, if these values are too high the adhesive tends to bond tenaciously, causing physical skin irritation. However, a relatively low tensile strength, needle penetration, and viscosity in combination with a high elongation at break allows the hot melt adhesive composition coating to deform to an optimum extent, improving the adherence to the substrate, without adhesive transfer or skin irritation.

Articles whereon at least one substrate is continuously or discontinuously coated with the hot melt adhesive composition of the present invention include plasters, bandages, feminine napkins, adult incontinent pads, diapers, tapes, medical devices such as eye patches, medicinal patches and electrode patches, and the like. The substrate is typically a plastic film, nonwoven, or textile material. The articles according to the present invention are particularly useful for plasters, gauze and bandages for medical purposes.

The present invention can also be exemplified by the following non-limiting examples. The present invention is not restricted or limited in scope by the exemplified hot melt adhesive composition nor articles constructed therefrom or the process of making such articles, but rather can be advantageously used for all removable hot melt adhesive applications.

EXAMPLES

Test Methods

1. The Brookfield Viscosity was determined with Brookfield models DVH, DV-II or DV-III. An appropriate spindle size and hot melt adhesive sample size was selected in accordance with the viscometer manufacturers instructions. The adhesive sample was melted in the thermocel at the temperature at which the viscosity was to be measured. The spindle was lowered into the melted adhesive sample. The motor was turned on at the lowest speed and the corresponding torque reading displayed. The speed was increased until the torque reading stabilized and the viscosity measurement recorded after 30 minutes.

2. The Ring and Ball Softening Point was determined with a Herzog MC 753 instrument. The rings were preheated to the melt temperature and then placed on release paper. The melted adhesive sample was then poured into the rings without inclusion of air bubbles. After cooling, excess adhesive was removed from the rings and two samples placed in the holder of the apparatus with a steel balls on top of each sample. The samples were lowered into a glycerin filled beaker positioned on a heating plate. The samples were lowered into the glycerin and heated at a rated of 5° C. per minute. The average temperature at which the balls have fallen is recorded, the difference being not more than 1° C.

3. The Needle Penetration was measured in accordance with DIN 51579 with a load of 100 g and a rate of 5 seconds.

4. The Tensile & Elongation was measured by first preparing a 20–30 mil (0.5–0.7 mm) thick adhesive film free of air bubbles. Cut dogbones lengthwise from the film measuring the thickness at the gauge section (4 mm±1.5 mm). Condition the samples for at least 24 hours at 21° C. and 23 to 50 percent relative humidity. Place each sample in the jaws of an Instron tensile tester or equivalent with a load cell capable of measuring a 4 pounds (1.8 kg) force±1 percent. Elongate samples crosshead speed of 100 mm/minute until break. Record the "Ultimate Tensile" at yield by dividing the maximum force by the cross-section area of the sample and "percent Elongation" by dividing the displacement at break by the sample length and multiply by 100. The "Ultimate Tensile" and "percent Elongation" are an average of three to five samples.

5. 180° Peels to Stainless Steel were determined using test method #PSTC-1.

6. The 180° Peels to a Textile Material was determined by first preparing hot melt coated adhesive films on Mylar or polyolefin film using a suitable coating device at an appropriate application temperature. During preparation of the adhesive film, the adhesive surface is covered with release paper to facilitate handling. The coat weight is checked targeting the indicated coat weight or 40 g/m²±3 g/m² where not indicated otherwise. The adhesive coated films are cut into 25 mm wide strips which are 170 mm in length in the machine direction. Remove the release paper and place the adhesive surface of one 1 inch (2.5 cm) wide strip onto the textile* material to form a composite. Place the composite on the mechanical roll-down device (2250 g at 120 inches/min), and allow the roller two passes over the sample, one forward and one back. Cut the strips in the middle to obtain two samples. The strip is placed into the mobile jaw and the fabric is placed in the stationary jaw. The procedure is repeated three times (six samples), recording the average T-peel value and noting any legging or transfer. The T-peel values are reported in grams per linear inch. It is preferred to have T-peels in the 100–500 g range, most preferred in the 200–500 g range without adhesive transfer.

Test fabrics available from TestFabrics (style 460.30 cotton interlock knit prewashed at 95° C., style 322 nylon tricot 6 prewashed at 40° C., and satin reference 010682 prewashed at 40° C. Prewashing is done without detergent.

7. A similar procedure was employed to measure the peel adhesion to skin with the exception that the adhesive coated strips were contacted to the inside forearm of the inventor and had a roller used to apply pressure.

8. To determine skin irritation an adhesive coated strip from each example was contacted to the forearm of an individual known to have very sensitive skin. After 3 days no irritation was noted.

9. Free Hanging Loop Tack

A film of adhesive about 1 mil thick is coated onto polyester (Mylar®) film. The film is then mated with release liner, and cut into 1 inch×5 inch strips (2.54 cm×12.7). A test sample is then inserted into a Loop Tack Tester with the adhesive side facing out (release liner removed). The Loop Tack Tester automatically records the tack value in Newtons/25 mm.

Example 1

| Ingredient | Tradename | %-Weight |
|---|---|---|
| SEBS Block copolymer | (KRATON) G 1726 | 30 |
| Tackifying resin | (ARKON) P125 | 40.7 |
| Oil | (CATENEX) P941 | 29 |
| Antioxidant | (IRGANOX) 1010 FF | 0.15 |
|  | (IRGANOX) PS800 | 0.15 |

Example 2

| SEBS Block copolymer | (KRATON) G 1726 | 30 |
|---|---|---|
|  | (KRATON) G 1657 | 4 |
| Tackifying resin | (ARKON) P90 | 13 |
|  | (ARKON) P125 | 27.7 |
| Oil | (CATENEX) P941 | 25 |
| Antioxidant | (IRGANOX) 1010 FF | 0.15 |
|  | IRGANIC PS800 | 0.15 |

Example 3

| SEBS Block copolymer | (KRATON) G 1726 | 30 |
|---|---|---|
| Tackifying resin | (ESCOREZ) 5340 | 44.7 |
| Oil | (CATENEX) P941 | 25 |
| Antioxidant | (IRGANOX) 1010 FF | 0.15 |
|  | (IRGANOX) PS800 | 0.15 |

Example 4

| SEBS Block copolymer | (KRATON) G 1726 | 30 |
|---|---|---|
| Tackifying resin | (ARKON) P125 | 30.7 |
|  | (ARKON) P140 | 10 |
| Oil | (CATENEX) P941 | 29 |
| Antioxidant | (IRGANOX) 1010 FF | 0.15 |
|  | (IRGANOX) PS800 | 0.15 |

Example 5

| SEBS Block copolymer | (KRATON) G 1726 | 30 |
|---|---|---|
| Tackifying resin | (ARKON) P125 | 35.7 |
|  | (ARKON) P140 | 5 |
| Oil | (CATENEX) P941 | 29 |
| Antioxidant | (IRGANOX) 1010 FF | 0.15 |
|  | (IRGANOX) PS800 | 0.15 |

Example 6

| | | |
|---|---|---|
| SEBS Block copolymer | (KRATON) G 1726 | 25 |
| | (KRATON) G 1657 | 5 |
| Tackifying resin | (ARKON) P90 | 49.7 |
| | (KRISTALEX) F85 | 5 |
| Oil | (CATENEX) P941 | 15 |
| Antioxidant | (IRGANOX) 1010 FF | 0.15 |
| | (IRGANOX) PS800 | 0.15 |

Example 7

| | | |
|---|---|---|
| SEBS Block copolymer | (KRATON) G 1726 | 30 |
| Tackifying resin | (ARKON) P90 | 49.7 |
| | (KRISTALEX) F85 | 5 |
| Oil | (CATENEX) P941 | 15 |
| Antioxidant | (IRGANOX) 1010 FF | 0.15 |
| | (IRGANOX) PS800 | 0.15 |

Example 8

| | | |
|---|---|---|
| SEBS Block copolymer | (KRATON) G 1657 | 30 |
| Tackifying resin | (ARKON) P125 | 40.7 |
| Oil | (CATENEX) P941 | 29 |
| Antioxidant | (IRGANOX) 1010 FF | 0.15 |
| | (IRGANOX) PS800 | 0.15 |

Example 9

| | | |
|---|---|---|
| SEBS Block copolymer | (KRATON) G 1726 | 33.00 |
| Tackifying resin | (ARKON) P125 | 41.70 |
| Oil | (CATENEX) P941 | 25 |
| Antioxidant | (IRGANOX) 1010 FF | 0.15 |
| | (IRGANOX) PS800 | 0.15 |

Example 10

| | | |
|---|---|---|
| SEBS Block copolymer | (KRATON) G 1652 | 10 |
| | (KRATON) G 1650 | 5.5 |
| Tackifying resin | (ESCOREZ) 5380 | 54.70 |
| Oil | (CATENEX) P941 | 29.50 |
| Antioxidant | (IRGANOX) 1010 FF | 0.15 |
| | (IRGANOX) PS800 | 0.15 |

Example 11

| | | |
|---|---|---|
| SEBS Block copolymer | (KRATON) G 1657 | 20 |
| Tackifying resin | (ARKON) P125 | 20 |
| | (ESCOREZ) 5340 | 32.7 |
| Oil | (CATENEX) 706 | 27 |
| Antioxidant | (IRGANOX) 1010 FF | 0.15 |
| | (IRGANOX) PS800 | 0.15 |

Example 12

| | | |
|---|---|---|
| SEBS Block copolymer | (KRATON) G 1650 | 15 |
| Tackifying resin | (ESCOREZ) 5320 | 55.7 |
| Oil | (CATENEX) P941 | 29 |
| Antioxidant | (IRGANOX) 1010 FF | 0.15 |
| | (IRGANOX) PS800 | 0.15 |

Example 13

| | | |
|---|---|---|
| SEBS Block copolymer | (KRATON) G 1652 | 15 |
| Tackifying resin | (ESCOREZ) 5320 | 55.70 |
| Oil | (CATENEX) P941 | 29 |
| Antioxidant | (IRGANOX) 1010 FF | 0.15 |
| | (IRGANOX) PS800 | 0.15 |

Examples 1–13 were made in a vertical mixer using known hot melt adhesive blending techniques.

Preparation of Coated Articles

The mixture of the components, as described in each of the Examples 1 to 13 were melted at 150° C. to 160° C. in a standard melting apparatus and extruded through an extrusion nozzle or through a screen directly onto the intended substrate of the article constructed therefrom. Alternatively, the melted hot melt composition is first extruded onto release paper and then transfer coated onto the intended surface of the article constructed therefrom, such as plasters, gauze and bandages for medical purposes.

Preparation of Coated Samples (see Table 1 and Table 2)

The components were melted, as in Example 14, in a melting apparatus and then full-coated onto the textile. The adhesion of the coated textile against steel and skin was measured.

TABLE I

Adhesion Properties of Full Coated Samples

| | Example 1 | Example 2 | Example 3 | Example 4 | Example 5 | Example 6 | Example 7 |
|---|---|---|---|---|---|---|---|
| Full coated on textile Coating weight - g/m$^2$ | 120 | 120 | 120 | 120 | 120 | 120 | 120 |
| Peel adhesion against the backside of the coated textile N/25 mm | 5.63 | 5.0 | 3.8 | 7.85 | 6.24 | 5.77 | 6.53 |

TABLE I-continued

Adhesion Properties of Full Coated Samples

|  | Example 1 | Example 2 | Example 3 | Example 4 | Example 5 | Example 6 | Example 7 |
|---|---|---|---|---|---|---|---|
| N/cm | 2.25 | 2.0 | 1.52 | 3.14 | 2.49 | 2.31 | 2.61 |
| Peel adhesion against steel N/25 mm | 14.8 | 19.2 | 28.4 | 27.0 | 14.8 | 17.0 | 24.0 |
| Free hanging loop N/25 mm | 10.6 | 13.5 | 26.0 | 24.8 | 8.9 | 19.0 | 20.0 |
| Peel adhesion against skin N/25 mm | 1.25 | 1.5 | 1.6 | 2.6 | 3.4 | 1.2 | 1.1 |

TABLE II

Adhesion Properties of Full Coated Samples

|  | Example 8 | Example 9 | Example 10 | Example 11 | Example 12 | Example 13 |
|---|---|---|---|---|---|---|
| Full coated on textile Coating weight - g/m² | 120 | 120 | 120 | 120 | 120 | 120 |
| Peel adhesion against the backside of the coated textile |  |  |  |  |  |  |
| N/25 mm |  | 3.75 | 4.75 | 3.5 | 5.85 |  |
| N/cm |  | 1.50 | 1.9 | 1.4 | 2.34 |  |

TABLE III

Physical Properties

|  | Example 1 | Example 2 | Example 3 | Example 4 | Example 5 | Example 6 | Example 7 |
|---|---|---|---|---|---|---|---|
| Viscosity measured on a Brookfield Viscosimeter, spindle 27 20 rpm at 175° C. [mPa × s] | 865 | 2080 | 1200 | 925 | 868 | 1850 | 1062 |
| Ring and Ball softening point [° C.] | 95 | 100 | 97 | 103 | 99 | 94 | 96 |
| Needle penetration at 25° C. [mm] | 9.8 | 7.9 | 8.5 | 9.9 | 11.2 | 6.4 | 7.0 |

TABLE IV

Physical Properties

|  | Example 8 | Example 9 | Example 10 | Example 11 | Example 12 | Example 13 |
|---|---|---|---|---|---|---|
| Viscosity measured on a Brookfield Viscosimeter, spindle 27 20 rpm at 175° C. [mPa × s] | 11900 (5 rpm) | 1360 | 600 | 4225 (10 rpm) | 1500 | 900 |
| Ring and Ball softening point [° C] | 90 | 102 | 80 | 77 | 104 | 85 |
| Needle penetration at 25° C. [mm] | 5.5 | 7.7 | 8.0 | 7.0 | 7.2 | 7.5 |
| Tensile strength [N/mm²] |  |  | 0.32 |  | 0.67 | 0.40 |
| Elongation at break [%] |  |  | 1124 |  | 985 | 838 |

What is claimed is:

1. An article for adherence to skin comprising:
   a) a substrate coated with a hot melt adhesive composition consisting essentially thereof:
   i) from about 15 weight-% to about 40 weight-% of at least one substantially saturated block copolymer having a melt index of greater than about 10 g/10 min;

ii) from about 30 weight-% to about 65 weight-% of at least one substantially saturated tackifying resin; and
iii) from about 5 weight-% to about 50 weight-% of at least one substantially saturated plasticizing oil;

wherein said adhesive has a viscosity ranging from about 500 cps to about 20,000 cps at 175° C. and is permanently adhered to said substrate and removably adheres to skin to secure said article.

2. The article of claim 1 wherein said block copolymer of said adhesive has styrenic end blocks and a midblock comprising ethylene/butylene, ethylene/propylene, or mixtures thereof.

3. The article of claim 2 wherein the ratio of endblock to midblock of said block copolymer of said adhesive ranges from $^{10}\!/\!_{90}$ to $^{40}\!/\!_{60}$ weight-% with respect to the weight of the block copolymer.

4. The article of claim 1 wherein the tackifying resin of said adhesive is selected from the group consisting of hydrogenated aliphatic resins, hydrogenated styrenic based resins, and mixtures thereof.

5. The article of claim 1 wherein the plasticizing oil comprises a paraffinic content of 50 weight-% to 90 weight-%, a naphthenic content of 10 weight-% to 40 weight-% and an aromatic content of no more than 10 weight-%.

6. The article of claim 1, wherein the adhesive composition has a ring and ball softening point ranging from about 80° C. to about 110° C.

7. The article of claim 1, wherein the adhesive composition has a viscosity ranging from about 500 to about 1200 mPa.s.

8. The article of claim 1, wherein the adhesive composition has a tensile strength ranging from about 0.10 to about 0.80 N/m$^2$.

9. The article of claim 1, wherein the adhesive composition has an elongation at break form about 500% to about 1500%.

10. The article of claim 1, wherein the adhesive composition has a needle penetration value at 25° C. ranging from about 3 to about 12 mm.

11. The article of claim 1 wherein the adhesive does not irritate the skin and is removable from the skin without leaving an adhesive residue.

12. The article according to claim 1, wherein said adhesive is coated onto said substrate as a number of individual adhesive hotmelt deposits ranging in deposits per areas from 1 per cm$^2$ to 100,000 per cm$^2$.

13. The article of claim 12, wherein the total mass of adhesive ranges from about 5 g/m$^2$ to about 500 g/m$^2$.

14. The article according to claim 1, wherein the article is a plaster, bandage, feminine napkin, adult incontinent pad, diaper, tape, medical device, eye patch, electrode patch.

15. A method for the production of an article comprising the steps of:
a) providing a substrate;
b) coating the adhesive composition of claim 1 onto said substrate.

16. The method of claim 15 wherein said adhesive is applied by a method selected from the group consisting of slot coating, spiral spraying, melt-blowing and pattern coating methods.

17. The method of claim 15 wherein said adhesive is applied by pattern coating.

18. The article of claim 12 wherein the total mass of adhesive ranges from from about 15 g/m$^2$ to about 300 g/m$^2$.

19. The article of claim 12 wherein the total mass of adhesive ranges from from about 60 g/m$^2$ to about 170 g/m$^2$.

20. The article of claim 12 wherein the total mass of adhesive ranges from from about 85 g/m$^2$ to about 150 g/m$^2$.

21. The article of claim 1 wherein the block copolymer has a diblock content of greater than about 35 wt-% of the block copolymer.

22. The article of claim 14 wherein the adhesive is present as one or more individual hot melt adhesive deposits ranging in mass from about $5 \times 10^{-5}$ to 0.05 grams per adhesive deposit.

23. The article of claim 14 wherein the number of individual hot melt adhesive deposits ranges from 1 to about 100 per cm$^2$.

* * * * *